US012502630B2

(12) United States Patent
Choi et al.

(10) Patent No.: US 12,502,630 B2
(45) Date of Patent: Dec. 23, 2025

(54) AIR PURIFIER

(71) Applicant: COWAY Co., Ltd., Gongju-si (KR)

(72) Inventors: Joon Young Choi, Seoul (KR); Yu Young Nam, Seoul (KR); Jun Hyoung Bae, Seoul (KR)

(73) Assignee: COWAY Co., Ltd., Gongju-si (KR)

( * ) Notice: Subject to any disclaimer, the term of this patent is extended or adjusted under 35 U.S.C. 154(b) by 336 days.

(21) Appl. No.: 18/318,782

(22) Filed: May 17, 2023

(65) Prior Publication Data

US 2023/0381702 A1    Nov. 30, 2023

(30) Foreign Application Priority Data

May 30, 2022 (KR) .................. 10-2022-0065796
Jun. 29, 2022 (KR) .................. 10-2022-0079787

(51) Int. Cl.
*B01D 46/00* (2022.01)
*B01D 46/16* (2006.01)
*B01D 46/62* (2022.01)

(52) U.S. Cl.
CPC ......... *B01D 46/0005* (2013.01); *B01D 46/16* (2013.01); *B01D 46/62* (2022.01); *B01D 2265/021* (2013.01); *B01D 2273/30* (2013.01)

(58) Field of Classification Search
CPC ............ B01D 46/0002; B01D 46/0004; B01D 46/0005; B01D 46/0012; B01D 46/0011; B01D 2279/40; B01D 2263/00; B01D 2263/08; B01D 2273/30; B01D 2267/00; B01D 2267/70; F24F 8/00; F24F 8/10; F24F 8/80; F24F 8/95; F24F 2203/60

USPC ... 55/385.1, 385.2, 467, 471, 472, 482, 495, 55/501, 504, 511

See application file for complete search history.

(56) References Cited

U.S. PATENT DOCUMENTS

| | | | | |
|---|---|---|---|---|
| 4,385,911 A | * | 5/1983 | Popeil ................... | B01D 46/10 55/504 |
| 4,976,753 A | * | 12/1990 | Huang ................... | F24F 13/20 55/501 |
| 5,035,728 A | * | 7/1991 | Fang ........................ | B03C 3/68 422/120 |

(Continued)

FOREIGN PATENT DOCUMENTS

| | | | | |
|---|---|---|---|---|
| KR | 10-2016-0099145 A | | 8/2016 | |
| KR | 10-2019-0143097 A | | 12/2019 | |
| KR | 20230095564 | * | 6/2023 | .............. F24F 13/28 |

*Primary Examiner* — Duane Smith
(74) *Attorney, Agent, or Firm* — Oblon, McClelland, Maier & Neustadt, L.L.P.

(57) ABSTRACT

An air purifier includes a filter member for filtering pollutants in the air, a blower for providing blowing force to allow the air to pass through the filter member, a body frame accommodating the blower, a cover frame that forms a part of an appearance of the air purifier and is detachably coupled to the body frame, and a filter frame that is detachably coupled to the cover frame and detachably supports at least a portion of the filter member. When the filter frame is coupled to the cover frame, the filter member is positioned between the cover frame and the filter frame so that movement of the filter member is restricted, and when the cover frame is attached to and detached from the body frame, the filter member and the filter frame are attached and detached together with the cover frame.

10 Claims, 9 Drawing Sheets

(56) References Cited

U.S. PATENT DOCUMENTS

| | | | | |
|---|---|---|---|---|
| 5,769,916 A * | 6/1998 | Immel | H05K 7/20181 | 55/504 |
| 5,800,583 A * | 9/1998 | Pippel | F24F 8/10 | 55/467 |
| 5,803,940 A * | 9/1998 | Rick | F24F 8/80 | 55/467 |
| 5,840,092 A * | 11/1998 | Rick | F24F 8/10 | 55/495 |
| 6,110,245 A * | 8/2000 | Schlag | B01D 46/001 | 55/471 |
| 6,494,940 B1 * | 12/2002 | Hak | B01D 46/10 | 96/417 |
| 6,913,637 B2 * | 7/2005 | Kim | B01D 46/62 | 96/417 |
| 8,951,322 B2 * | 2/2015 | Pfannenberg | F04D 29/703 | 55/467 |
| 2005/0132681 A1 * | 6/2005 | Chu | B01D 53/0415 | 55/471 |
| 2007/0000221 A1 * | 1/2007 | Park | B01D 46/10 | 55/471 |
| 2007/0012192 A1 * | 1/2007 | Pippel | B01D 46/44 | 96/417 |
| 2007/0221061 A1 * | 9/2007 | Steiner | F24F 8/10 | 55/467 |
| 2007/0272082 A1 * | 11/2007 | Johansson | B01D 46/521 | 96/417 |
| 2008/0121107 A1 * | 5/2008 | Pfannenberg | B01D 46/0005 | 96/417 |
| 2010/0089243 A1 * | 4/2010 | Bailey | B01D 46/0038 | 55/471 |
| 2011/0197770 A1 * | 8/2011 | Yun | F24F 1/0071 | 55/438 |
| 2013/0067875 A1 * | 3/2013 | Hartmann | B01D 46/10 | 55/428 |
| 2014/0215981 A1 * | 8/2014 | Pfannenberg | H05K 7/20181 | 55/501 |
| 2015/0290572 A1 * | 10/2015 | Stoner, Jr. | B01D 46/4254 | 55/504 |
| 2015/0352479 A1 * | 12/2015 | Kim | B03C 3/32 | 55/471 |
| 2021/0187424 A1 * | 6/2021 | Kim | F24F 1/0073 | |
| 2021/0325063 A1 * | 10/2021 | Park | F24F 13/28 | |
| 2022/0090801 A1 * | 3/2022 | Zeng | F24F 8/192 | |
| 2022/0404045 A1 * | 12/2022 | Park | A61L 9/20 | |
| 2023/0142796 A1 * | 5/2023 | Kim | B01D 46/0038 | 55/471 |
| 2023/0184635 A1 * | 6/2023 | Park | F24F 13/20 | 73/28.01 |
| 2023/0233973 A1 * | 7/2023 | Osawa | F24F 13/14 | 55/357 |
| 2024/0100464 A1 * | 3/2024 | Choi | B01D 46/0006 | |
| 2024/0189751 A1 * | 6/2024 | Bae | B01D 46/0006 | |
| 2024/0344737 A1 * | 10/2024 | Choi | F24F 8/108 | |

* cited by examiner

AIR PURIFIER

TECHNICAL FIELD

The present disclosure relates to an air purifier.

BACKGROUND

In general, an air purifier is a device for sucking polluted indoor air, and filtering out dust, odor particles, and the like contained in the air through a filter to purify the air into clean air. Such an air purifier may purify indoor air by sucking in and purifying the surrounding polluted air, and then discharging the purified clean air to the outside of the air purifier.

Meanwhile, the air purifier may include a filter for filtering out dust, odor particles, and the like contained in the air introduced into the air purifier. For example, the air purifier may include various types of filters having different functions, such as a pre-filter, a HEPA filter, a deodorizing filter, and a functional filter. Among them, the pre-filter may primarily filter dust having a relatively larger size than fine dust. If dust accumulates on the pre-filter during the filtration process, the pre-filter may be cleaned with water and reused.

However, in the conventional pre-filter, since a filter net and a frame supporting the filter net are integrated, the filter net cannot be separated from the frame to be cleaned.

In this regard, Korean Patent Application Publication No. 10-2016-0099145 of the present applicant "Air purifier" (Patent Document 1) discloses a first air purifying filter, a second air purifying filter, a functional filter, a pre-filter, a frame supporting the filters.

However, since the filter of Patent Document 1, for example, the pre-filter is a microfiber filter in which a microfiber mesh and an injection molded part supporting the microfiber mesh are integrally formed, when the dusty microfiber filter is separated from the air purifier to be cleaned, it may take a long time to clean the microfiber filter, and it may be difficult to completely remove foreign substances penetrating into the microfiber filter when cleaning the microfiber filter.

For example, when cleaning a dusty microfiber filter by spraying water onto the dusty microfiber filter, the microfiber filter can be washed in a short time, but foreign substances penetrating into the microfiber filter may not be completely removed even after cleaning the microfiber filter. In addition, when the dusty microfiber filter is cleaned using a cleaning brush, the microfiber filter can be cleaned completely, but the microfiber filter may be damaged in the process of cleaning the microfiber filter and it is inconvenient and takes a long time to clean the microfiber filter.

In addition, Korean Patent Application Publication No. 10-2019-0143097 "Filter and pre-filter of air purifier" (Patent Document 2) discloses a filter unit including a filter for filtering dust and a frame capable of supporting the filter which are integrally formed.

However, since the filter unit of Patent Document 2 has a structure in which the frame made of a material such as plastic or metal and the filter made of a metal material are integrally formed together, the manufacturing cost thereof is high, and when the filter unit is replaced, the filter unit that is replaced and discarded may cause environmental pollution.

For example, since the filter unit has a structure in which the filter is formed of a mesh shape in the frame made of plastic or metal having relatively high rigidity, there is a problem in that the manufacturing cost for manufacturing the filter unit is high. In addition, since the filter unit is made of a material such as plastic, optical fiber, and metal, it is difficult to naturally decompose, so when replacing the filter unit with accumulated dust with a new filter unit due to cumbersome water washing, the filter unit that is replaced and discarded may cause environmental pollution.

PRIOR ART DOCUMENT

Patent Document (Patent Document 1) Korean Patent Application Publication No. 10-2016-0099145 (published on Aug. 22, 2016)

(Patent Document 2) Korean Patent Application Publication No. 10-2019-0143097 (Published on Dec. 30, 2019)

SUMMARY

In view of the above, the present disclosure provides an air purifier including a filter net capable of being completely cleaned and easily and quickly replaced.

In accordance with one embodiment of the present disclosure, there is provided an air purifier for filtering air including: a filter member for filtering pollutants in the air; a blower for providing blowing force to allow the air to pass through the filter member; a body frame accommodating the blower; a cover frame that forms a part of an appearance of the air purifier and is detachably coupled to the body frame; and a filter frame that is detachably coupled to the cover frame and detachably supports at least a portion of the filter member, wherein when the filter frame is coupled to the cover frame, the filter member is positioned between the cover frame and the filter frame so that movement of the filter member is restricted, and when the cover frame is attached to and detached from the body frame, the filter member and the filter frame are attached and detached together with the cover frame.

The filter frame may include a filter rib part including a plurality of filter rib members connected to each other; and a filter edge part connected to ends of the plurality of filter rib members and extending along an edge of the filter rib part, wherein when viewed from a front side of the air purifier, the filter edge part may have a wider width than that of the filter rib part.

The cover frame may include a cover rib part including a plurality of cover rib members connected to each other; and a cover edge part connected to ends of the plurality of cover rib members and extending along an edge of the cover rib part, wherein the plurality of filter rib members may be disposed to face at least a portion of the plurality of cover rib members.

The cover frame may further include a cover fixing part formed on the cover edge part, the filter frame may further include a filter fixing part formed on the filter edge part so as to be engaged with the cover fixing part in an up-down direction, and the cover fixing part and the filter fixing part may have a protrusion or groove shape to be engaged with each other.

The cover frame may further include a cover seating part extending along at least a portion of an edge of the filter member and protruding rearward from the cover edge part; and a cover locking part protruding from the cover seating part toward a center of the cover frame, wherein the filter member may be seated between the cover edge part and the cover locking part.

The cover frame may further include a cover engagement part formed in the cover seating part, the filter frame may further include a filter engagement part formed on the filter edge part to selectively engage with the cover engagement part by moving in an up-down direction, and the cover engagement part and the filter engagement part may have a protrusion or groove shape to be engaged with each other.

The filter member may be a filter net having a breaking strength in a range of 12 kgf to 16 kgf.

The filter member may have flexibility so that a portion between opposite edges of the filter member is continuously bendable.

The air purifier may further include an air filter for re-filtering the air filtered by the filter member.

The body frame may include a body part providing a chamber in which the air filter and the blower are accommodated; and an insertion groove portion in which a cover coupling part of the cover frame is inserted to be coupled.

According to embodiments of the present disclosure, by providing the flexible filter member that is continuously bendable, when cleaning the flexible filter with water, the flexible filter can be cleaned by rubbing it with hands.

Further, the filter member can be easily and quickly replaced by reducing the overall weight and volume of the pre-filter through the use of only the filter member.

In addition, the purification efficiency of the air purifier can be improved through the quick and easy replacement of the filter member.

DETAILED DESCRIPTION

Hereinafter, specific embodiments for implementing an idea of the present disclosure will be described in detail with reference to the drawings.

In describing the present disclosure, detailed descriptions of known configurations or functions may be omitted to clarify the present disclosure.

The terms used in the present specification are only used for describing specific embodiments, and are not intended to limit the present disclosure. Singular expressions include plural expressions unless the context clearly indicates otherwise.

In addition, in the present specification, expressions such as upper, lower, side, etc. are described based on the drawings, and it is made clear in advance that they may be expressed differently if the direction of the object is changed. For the same reason, some components in the accompanying drawings are exaggerated, omitted, or schematically illustrated, and the size of each component does not reflect the actual size.

In the present specification, it is to be understood that the terms such as "including" are intended to indicate the existence of certain features, areas, integers, steps, actions, elements, components and/or groups disclosed in the specification, and are not intended to preclude the possibility that other certain features, areas, integers, steps, actions, elements, components, and/or groups may exist or may be added.

Figure 1:
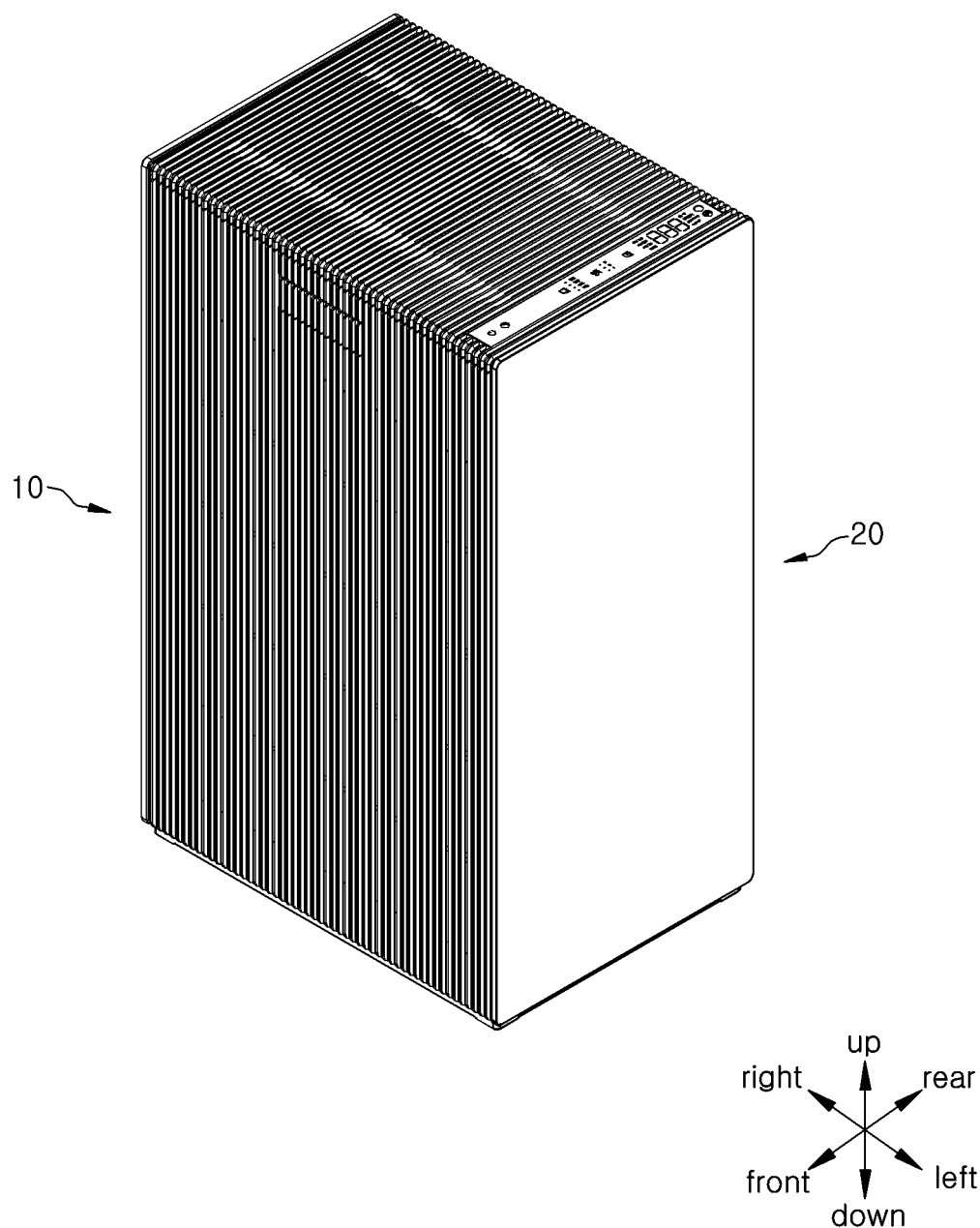
FIG. 1 is a perspective view showing an air purifier according to one embodiment of the present disclosure.
Figure 2:
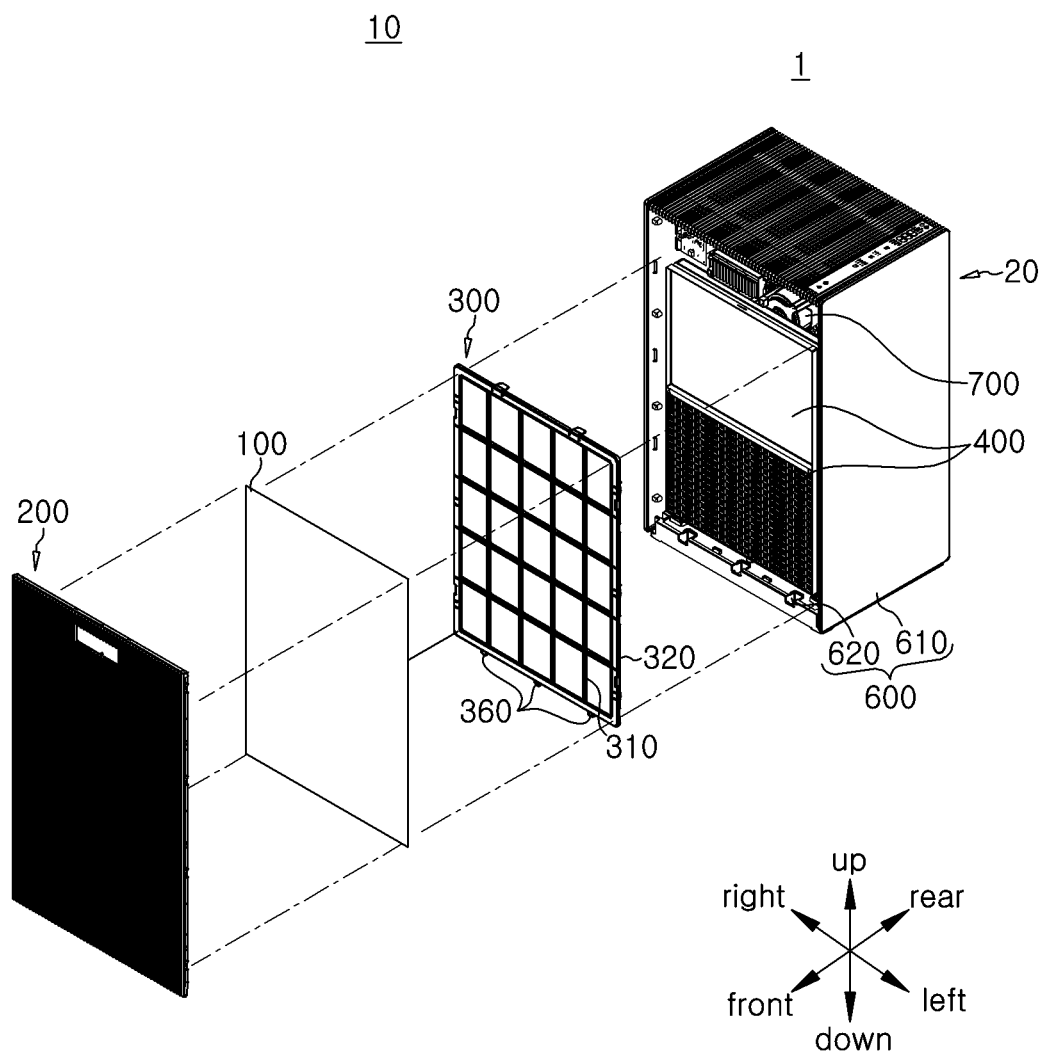
FIG. 2 is an exploded perspective view of the air purifier according to one embodiment of the present disclosure viewed from above.
Figure 3:
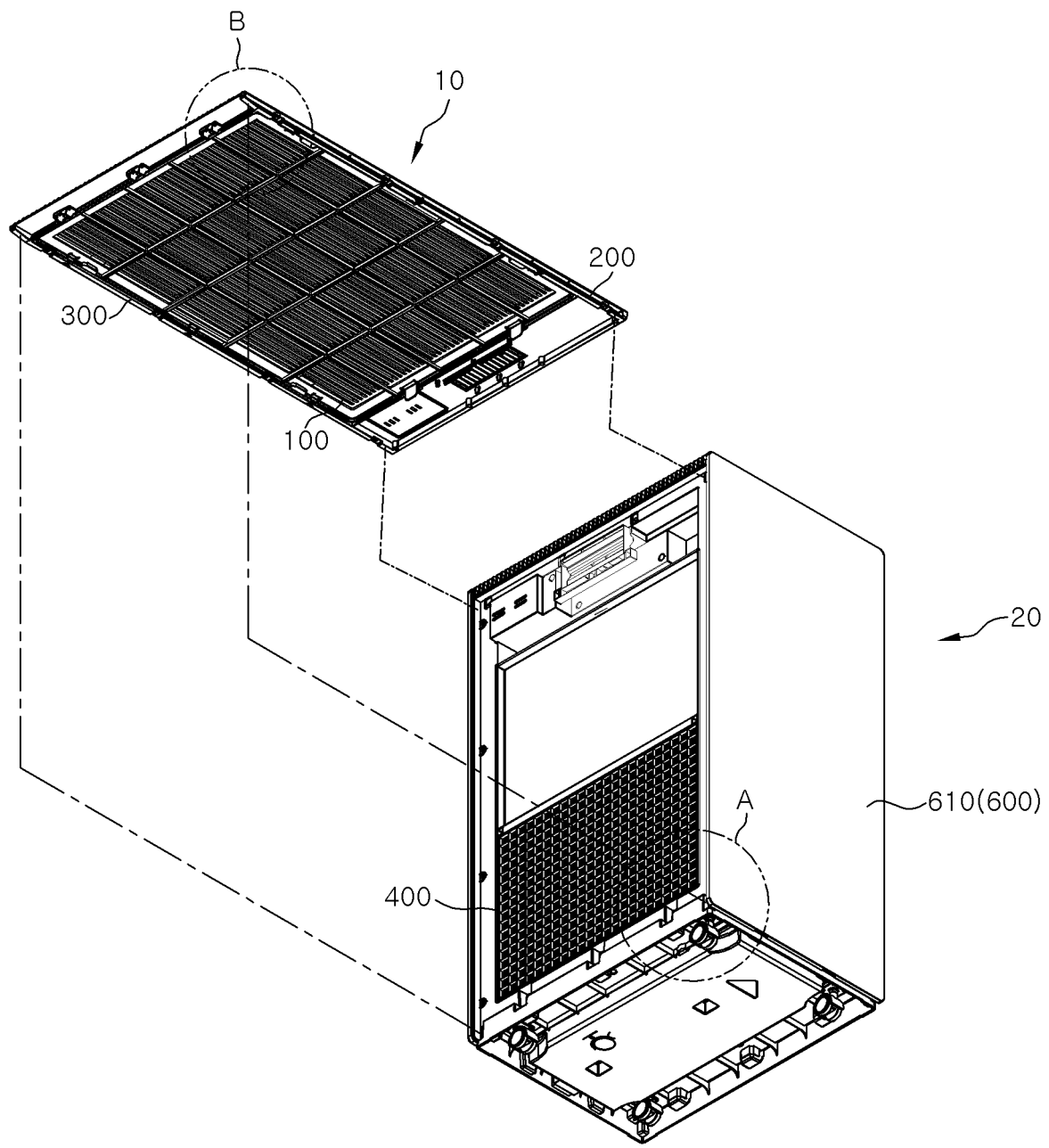
FIG. 3 is an exploded perspective view of the air purifier according to one embodiment of the present disclosure viewed from below.
Figure 3:
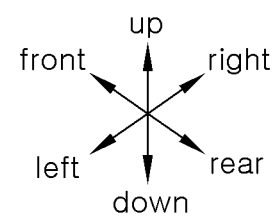
Figure 4:
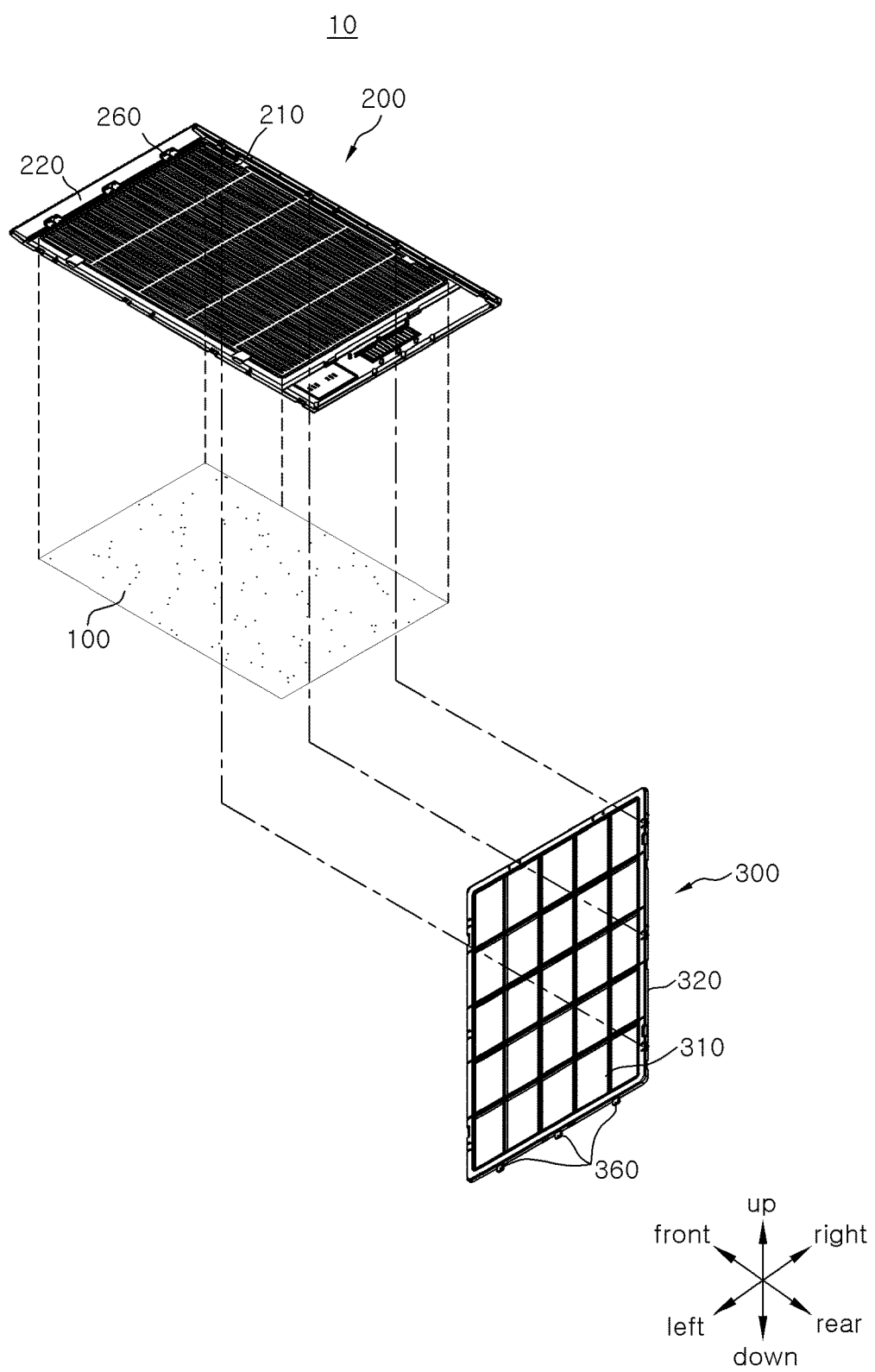
FIG. 4 is an exploded perspective view showing a filter assembly of the air purifier according to one embodiment of the present disclosure.
Figure 5:
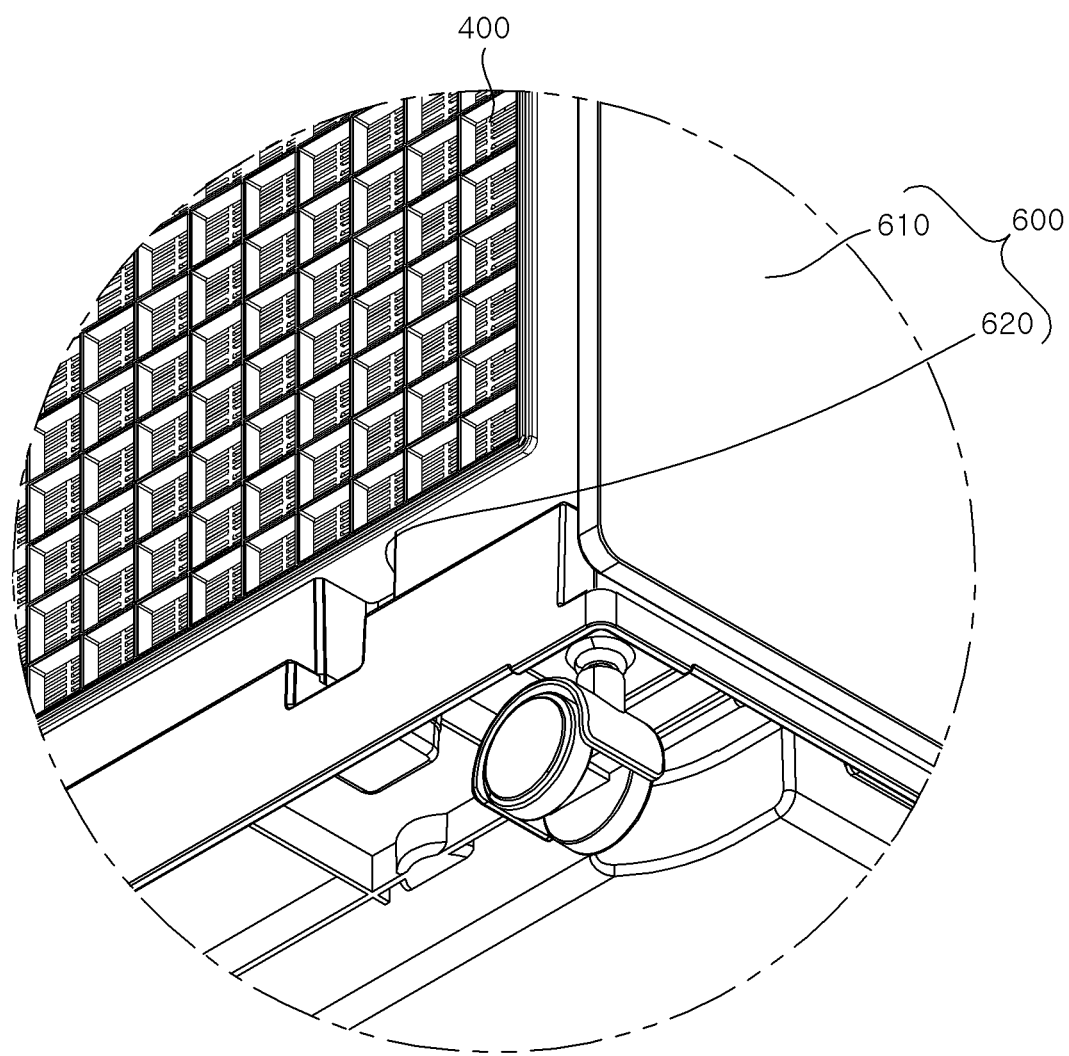
FIG. 5 is an enlarged view of part "A" of FIG. 3.
Figure 6:
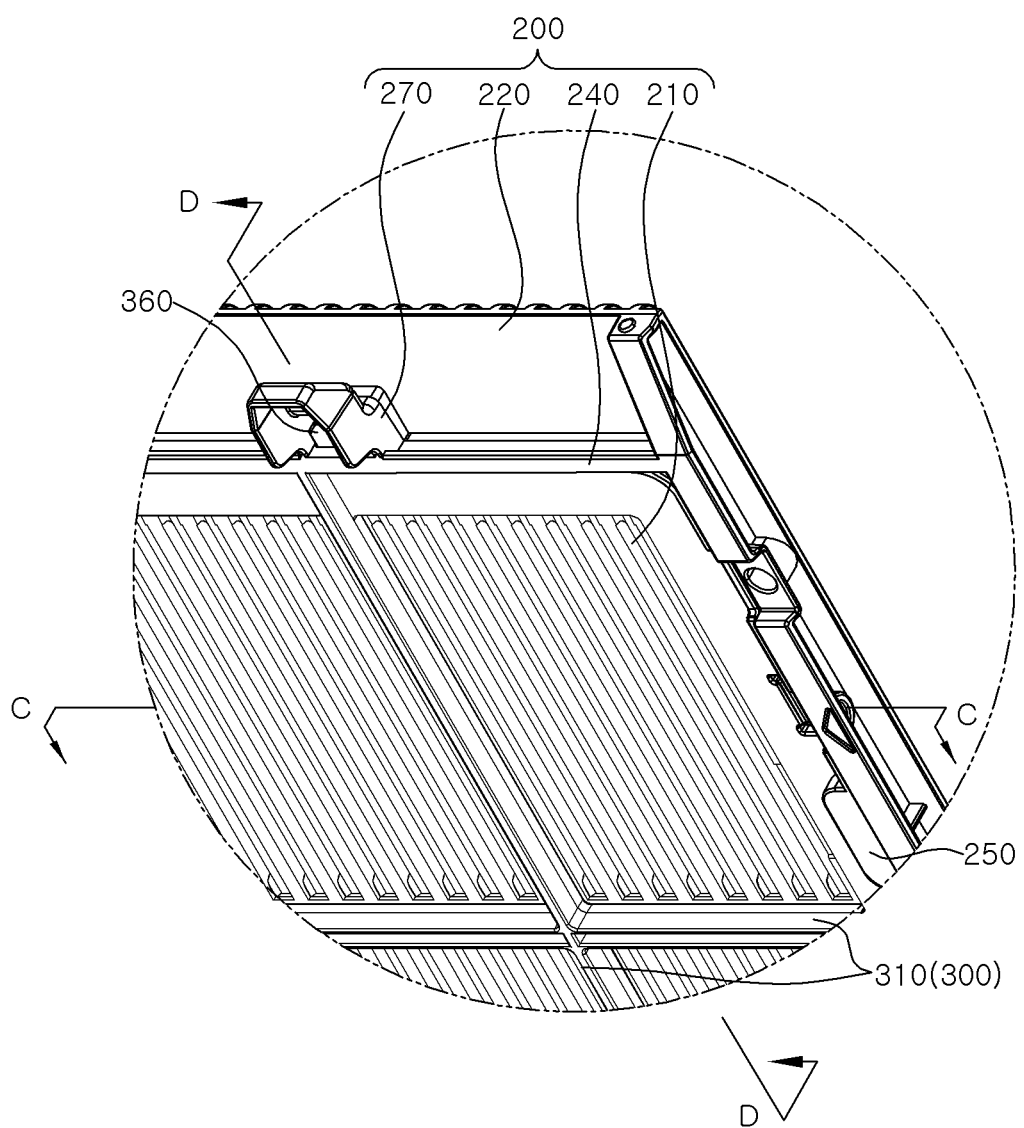
FIG. 6 is an enlarged view of part "B" of FIG. 3.
Figure 7:
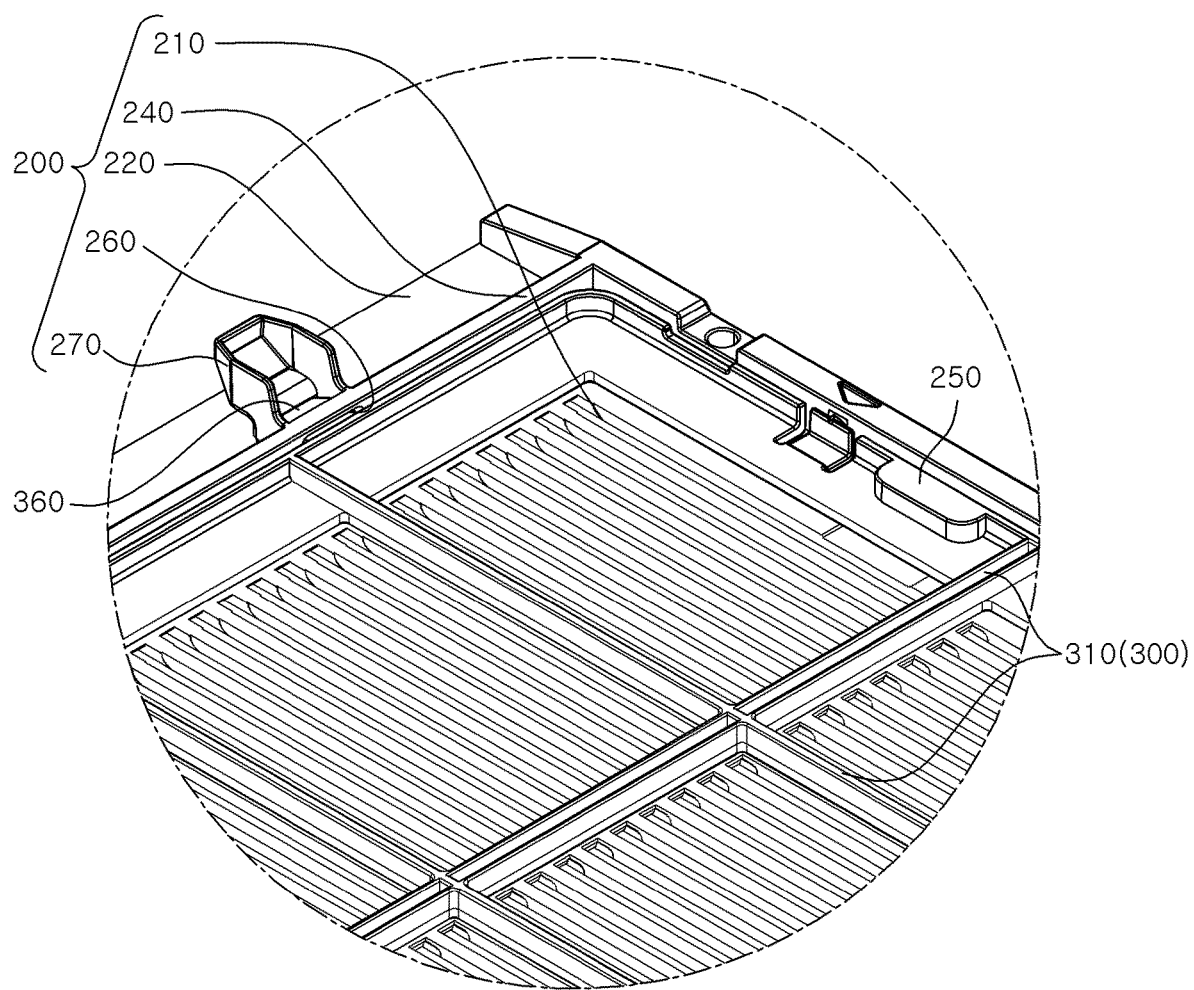
FIG. 7 is an enlarged view of part "B" of FIG. 3 viewed from another direction.
Figure 8:
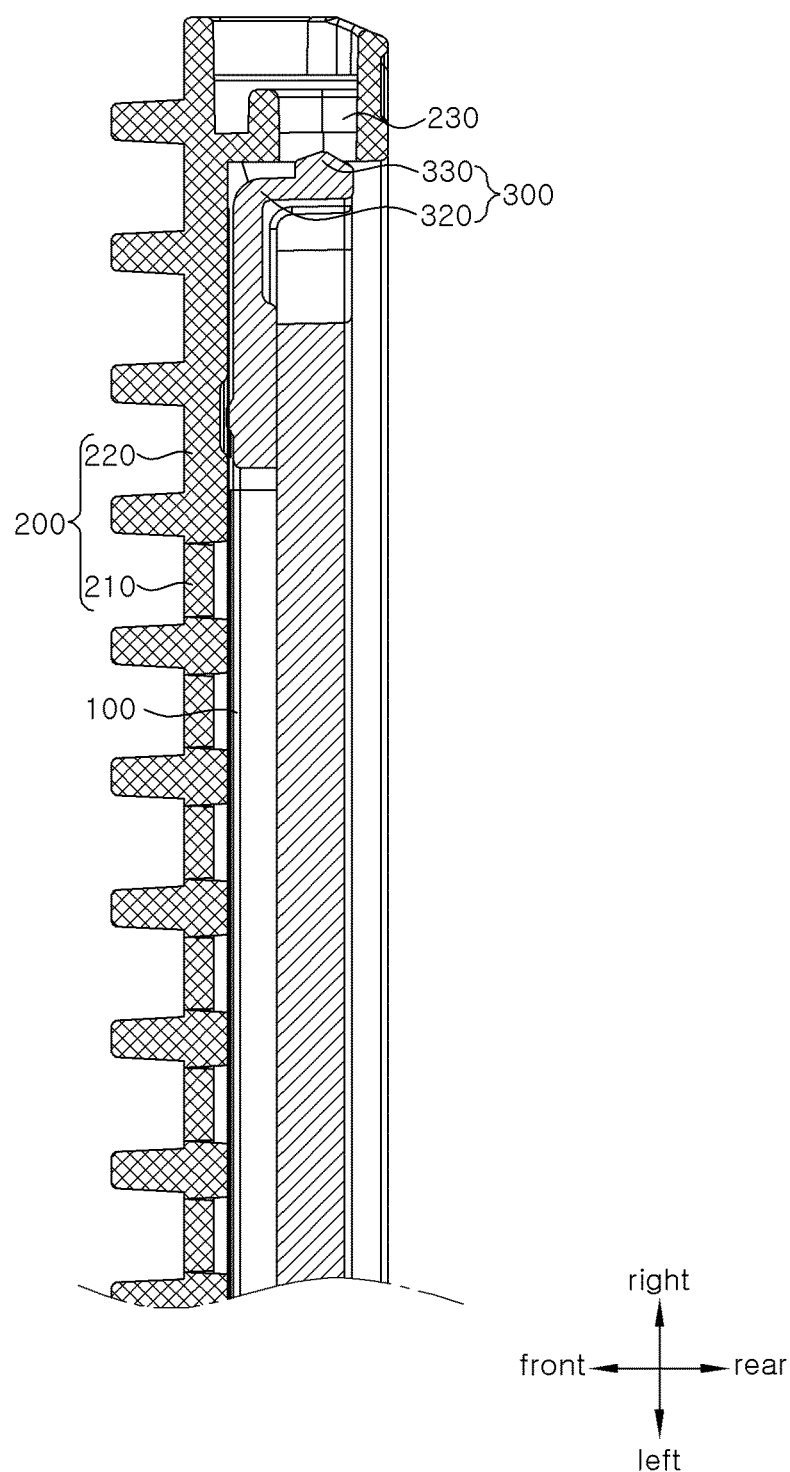
FIG. 8 is a cross-sectional view taken along line "C-C" of FIG. 6.
Figure 9:
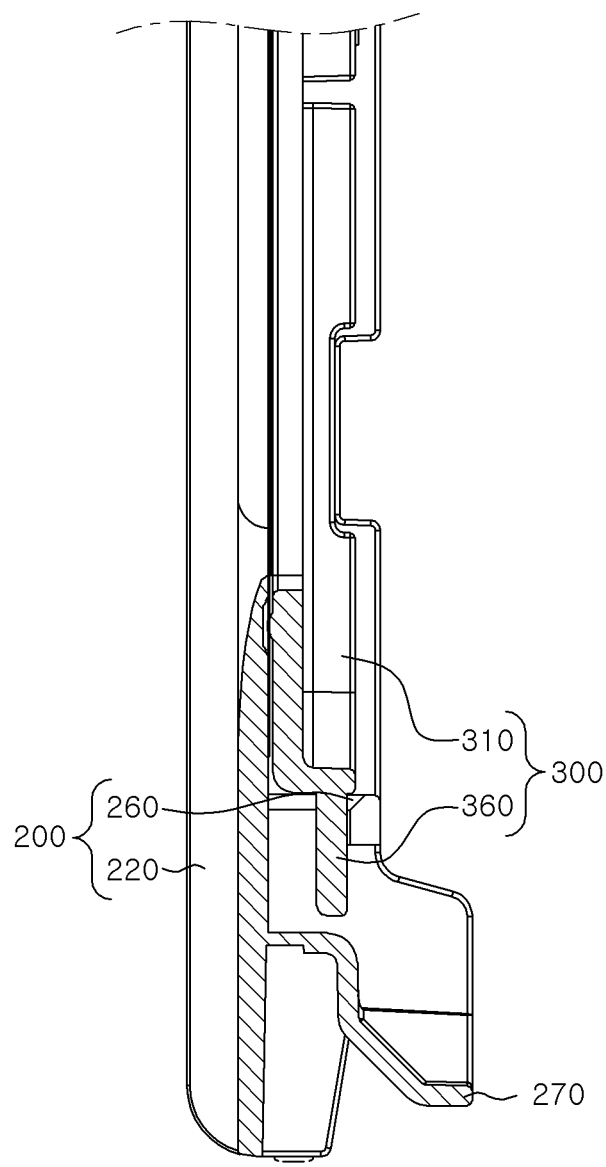
FIG. 9 is a cross-sectional view taken along line "D-D" of FIG. 6.
Figure 9:
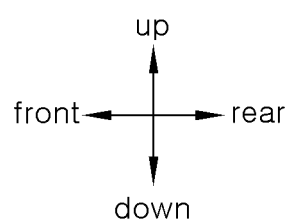

Referring to FIGS. 1 to 3, an air purifier 1 according to one embodiment of the present disclosure can purify polluted air to clean air by filtering out dust, odor particles, etc. in the air introduced into the air purifier 1. In addition, the air purifier 1 may suck in outside air and discharge clean air purified in the air purifier 1 to the outside. The air purifier 1 may include a filter assembly 10 and a purifier main body 20.

The filter assembly 10 may filter external air into clean air. The filter assembly 10 may be detachably mounted to the purifier main body 20. For example, when the filter assembly 10 is used for a predetermined period of time, it may be replaced with a new filter assembly 10.

The filter assembly 10 may be disposed in a front portion of the purifier main body 20. In this case, the filter assembly 10 may filter air introduced from the front side of the purifier main body 20.

The purifier main body 20 may support the filter assembly 10 detachably mounted. The filter assembly 10 may be mounted in the front portion of the purifier main body 20.

The filter assembly 10 may include a filter member 100, a cover frame 200, and a filter frame 300, and the purifier main body 20 may include an air filter 400, a body frame 600, and a blower 700.

The filter member 100 may be provided to filter out pollutants in the air. For example, the filter member 100 may be a filter net capable of primarily filtering out pollutants in the air. After the filter member 100 is cut out, seams may be removed from edges of the filter member 100 to smoothly finish the edges of the filter member 100.

The filter member 100 may be a mesh fabric made of a flexible material. A portion between opposite edges of the filter member 100 is continuously bendable. The filter member 100 may not include a rigid frame member and may have flexibility. In addition, the filter member 100 may be formed of a single continuous material. When cleaning the filter member 100 with water, the filter member 100 can be cleaned by rubbing it with a hand. The filter member 100 can be cleaned more cleanly than being washed by simple water spray.

The filter member 100 may be a filter net having a breaking strength in a range of 12 kgf to 16 kgf. The filter member 100 may be formed of only a filter net (mesh fabric) for filtration. The filter member 100 may have a lighter weight and smaller volume than a filter in which a filter net and an injection molded part are integrally formed. In this way, since the filter member 100 has a light weight and a small volume, it can be easily separated from the filter assembly 10. The filter member 100 separated from the filter assembly 10 may be cleaned and reused, or may be replaced with a new filter member.

Referring to FIGS. 4 to 9, the cover frame 200 may be assembled to the front portion of the purifier main body 20 to be disposed on the front side of the filter member 100. The cover frame 200 may be detachably coupled to the front portion of the purifier main body 20, that is, to a front portion of the body frame 600.

The cover frame 200 may form a part of the appearance of the air purifier 1. For example, the cover frame 200 may form a front side appearance of the air purifier 1. The cover frame 200 can be detachably coupled to the body frame 600 of the purifier main body 20, and the cover frame 200 can detachably support the filter member 100.

The cover frame 200 may include a cover rib part 210, a cover edge part 220, a cover fixing part 230, a cover seating part 240, a cover locking part 250, a cover engagement part 260, and a cover coupling part 270.

The cover rib part 210 may include a plurality of cover rib members connected to each other in a lattice pattern. An inlet may be formed between the plurality of cover rib members. The inlet may provide a passage for outside air through which outside air is introduced into the purifier main body 20.

In the present embodiment, the plurality of cover rib members are connected to each other in the lattice pattern, but the plurality of cover rib members may be arranged only in one direction (e.g., in a vertical direction) or in the other direction (e.g., in a horizontal direction) without being limited to the above.

The cover edge part 220 may extend along the edge of the cover rib part 210 to be connected to ends of the plurality of cover rib members. At least some of the plurality of cover rib members may be disposed to overlap a plurality of filter rib members of the filter frame 300. In other words, since the plurality of cover rib members are disposed to face the plurality of filter rib members, outside air passing through the inlet of the cover rib part 210 can be introduced into the purifier main body 20 without interference by the filter rib members.

The cover fixing part 230 may be formed in a groove shape in both side portions of the cover edge part 220. A filter fixing part 330 of the filter frame 300 may be inserted into and engaged with the cover fixing part 230. The cover fixing part 230 may have an inner diameter at least larger than an outer diameter of the filter fixing part 330. In the present embodiment, the cover fixing part 230 is formed in the groove shape, but the cover fixing part 230 may have a protrusion shape that can be engaged with the filter fixing part 330 without being limited to the above.

Through the engagement between the cover fixing part 230 of the cover frame 200 and the filter fixing part 330 of the filter frame 300, the both side portions of the filter frame 300 and the both side portions of the cover frame 200 can be fixed.

The cover seating part 240 may extend along at least a portion of an edge of the filter member 100. The cover seating part 240 may have a rectangular frame shape corresponding to an outer edge portion of the filter frame 300. The cover seating part 240 may have a shape protruding rearward from the cover edge part 220. When the filter frame 300 is assembled to the cover frame 200, the cover seating part 240 may support an edge portion of the filter frame 300 assembled in a central portion of the cover frame 200.

The cover locking part 250 may include a plurality of cover locking parts 250 provided in both side portions of the cover edge part 220 and spaced apart in an up-down direction. The cover locking part 250 may be a locking protrusion protruded from the both side portions of the cover edge part 220, more specifically, from the cover seating part 240 toward the center of the cover frame 200. When the filter frame 300 is assembled to the cover frame 200, both side portions of the filter member 100 and the filter frame 300 may be fitted and seated between the cover edge part 220 and the cover locking part 250.

The cover engagement part 260 may include a plurality of cover engagement parts 260 that are provided in an upper portion and a lower portion of the cover edge part 220 to be spaced apart from each other in a left-right direction. The cover engagement part 260 may be formed in a hole shape penetrating the cover seating part 240 positioned in the upper portion and the lower portion of the cover edge part 220. When the filter frame 300 is assembled to the cover frame 200, a filter engagement part 360 of the filter frame 300 may be inserted into the cover engagement part 260 to be engaged. In the present embodiment, the cover seating part 240 is formed in the hole shape, but the cover seating part 240 may have a protrusion shape that can be engaged with the filter engagement part 360 without being limited to the above.

The cover coupling part 270 may be provided in the upper portion and the lower portion of the cover edge part 220 where the cover engagement part 260 is formed. The cover coupling part 270 may be disposed at the cover edge part 220 to surround the cover engagement part 260. The cover coupling part 270 may cover the filter engagement part 360 inserted into the cover engagement part 260.

The cover coupling part 270 may have a bracket shape that protrudes from the cover edge part 220 to be bent so as to correspond to a groove shape of an insertion groove portion 620. When the filter assembly 10 is assembled to the purifier main body 20, the cover coupling part 270 may be inserted into the insertion groove portion 620 of the body frame 600 to be coupled thereto.

The filter frame 300 may be disposed on the rear side of the filter member 100 so as to be detachably attached to the cover frame 200. The filter frame 300 may be assembled to the cover frame 200 with the filter member 100 interposed therebetween. When the filter frame 300 is assembled to the cover frame 200, the filter frame 300 may be seated in the inner side of the cover seating part 240 of the cover frame 200. In other words, when the filter frame 300 is coupled to the cover frame 200, since the filter member 100 is positioned between the cover frame 200 and the filter frame 300, the movement of the filter member 100 can be restricted.

The filter frame 300 may detachably support at least a portion of the filter member 100. The filter frame 300 may include a filter rib part 310, a filter edge part 320, a filter fixing part 330, and a filter engagement part 360.

The filter rib part 310 may include a plurality of filter rib members connected to each other in a lattice pattern. As a matter of course, the plurality of filter rib members may be arranged only in one direction (e.g., in the vertical direction) or in the other direction (e.g., in the horizontal direction) without being limited to the above.

A frontmost surface of the filter rib part 310 may be disposed to detachably contact a rear surface of the filter member 100. In other words, the filter rib part 310 and the filter member 100 may not be bonded or fixed to each other. When the filter frame 300 is assembled to the cover frame 200, the plurality of filter rib members may be disposed to overlap the plurality of cover rib members. The plurality of filter rib members may be spaced apart from each other to form spaces through which air can flow.

The frontmost surface of the filter rib part 310 may be disposed to detachably contact the rear surface of the filter member 100. The space formed by the filter rib members (i.e., the space defined by the adjacent filter rib members) may be provided as an empty space in which no component is provided. In other words, the plurality of filter rib members are not indirectly connected by other components. Since the plurality of filter rib members are disposed to overlap the plurality of cover rib members, outside air passing through the inlet of the cover rib part 210 can be introduced into the purifier main body 20 without interference by the filter rib members.

The filter edge part 320 may be connected to ends of the plurality of filter rib members to form an edge portion of the filter frame 300. When viewed from the front side of the air purifier 1, the filter edge part 320 may have a wider width than that of the filter rib part 310. Since the filter edge part 320 has the width wider than that of the filter rib part 310, the overall rigidity of the filter frame 300 can be increased.

The filter fixing part 330 may be formed in a protrusion shape in both side portions of the filter edge part 320. When the filter frame 300 is assembled to the cover frame 200, the filter fixing part 330 may be inserted into and engaged with the cover fixing part 230 in the left-right direction. The filter fixing part 330 may have an outer diameter that is at least smaller than an inner diameter of the cover fixing part 230. In the present embodiment, the filter fixing part 330 is formed in the protrusion shape, but the filter fixing part 330 may have a groove shape that can be engaged with the filter fixing part 330 without being limited to the above.

The filter engagement part 360 may include a plurality of filter engagement parts 360 that are provided in an upper portion and a lower portion of the filter edge part 320 to be spaced apart from each other in the left-right direction. The filter engagement part 360 may have a protruding shape that can be engaged with the cover engagement part 260. When the filter frame 300 is assembled to the cover frame 200, the filter engagement part 360 may be selectively engaged with the cover engagement part 260 by moving in the up-down direction. In particular, when the cover frame 200 is attached to and detached from the body frame 600, the filter member 100 and the filter frame 300 can be attached and detached together with the cover frame 200.

The air filter 400 may re-filter the air filtered by the filter assembly 10. The air filter 400 may include a plurality of various types of filters having different functions, such as a HEPA filter, a deodorization filter, and a functional filter. The air filter 400 may be replaceably mounted to the body frame 600.

The body frame 600 may support the filter assembly 10, the air filter 400, and the blower 700. A space may be formed inside the body frame 600. A front side portion of the body frame 600 may support the filter assembly 10 to allow the filter assembly 10 to be detachable.

The air filter 400 and the blower 700 may be accommodated in the body frame 600. A discharge port may be formed in an upper portion of the body frame 600. The discharge port may provide a passage for discharging filtered air that has passed through the air filter 400 to the outside.

The body frame 600 may include a body part 610 and an insertion groove portion 620. The body part 610 may provide a frame capable of supporting the filter assembly 10, the air filter 400, and the blower 700. For example, a space may be formed in the body part 610 to support the filter assembly 10, the air filter 400, and the blower 700.

The discharge port may be formed in an upper portion of the body part 610. The discharge port may provide a passage for discharging air that has been introduced into the body frame 600 and has passed through the air filter 400 to the outside.

The insertion groove portion 620 may be provided in a groove shape in an edge portion of the body part 610. The insertion groove portion 620 may be a groove having a shape corresponding to the cover coupling part 270 of the filter assembly 10. When the filter assembly 10 is assembled to the purifier main body 20, the cover coupling part 270 of the filter assembly 10 may be inserted and coupled into the insertion groove portion 620.

The blower 700 may provide blowing force for allowing outside air to pass through the filter assembly 10 and the air filter 400 and to flow into the body frame 600. For example, the blower 700 may be driven so that polluted air outside the air purifier 1 flows into the air purifier 1. In addition, the blower 700 may be driven to discharge air purified by the filter assembly and the air filter 400 in the air purifier 1 to the outside. The blower 700 may include a blowing fan and a fan motor for driving the blowing fan. The blowing fan may rotate about a rotational axis extending in a front-rear direction.

Hereinafter, effects of the air purifier having the configurations described above will be described.

When assembling the filter assembly 10, the filter frame 300 can be coupled to the cover frame 200 with the filter member 100 interposed therebetween. When the filter frame 300 is coupled to the cover frame 200, the both side portions of the filter frame 300 can be coupled to the both side portions of the cover frame 200, respectively, and the upper and lower portions of the filter frame 300 can be coupled to the upper and lower portions of the cover frame 200, respectively.

For example, in a state in which the filter member 100 is disposed on the rear side of the cover frame 200, the filter frame 300 can be disposed in the inner space surrounded by the cover seating part 240 of the cover frame 200. In this case, the both side portions of the filter member 100 and the filter frame 300 can be seated by being interposed between the cover edge part 220 and the cover locking part 250.

Further, the filter fixing part 330 of the filter frame 300 can be engaged with the cover fixing part 230 of the cover frame 200 in the left-right direction. In other words, the filter fixing part 330 of the filter frame 300 may be inserted into and coupled to the cover fixing part 230 of the cover frame 200.

In addition, the filter engagement part 360 of the filter frame 300 can be engaged with the cover engagement part 260 of the cover frame 200 in the up-down direction. In other words, the filter engagement part 360 of the filter frame 300 may be inserted into and coupled to the cover engagement part 260 of the cover frame 200.

In this way, when the filter frame 300, the filter member 100, and the cover frame 200 are assembled to form the filter assembly 10, the filter fixing part 330 and the filter engagement part 360 of the filter frame 300 can be engaged with the cover fixing part 230 and the cover engagement part 260 of the cover frame 200 in the left-right direction and the up-down direction, respectively.

Meanwhile, in order to separate the filter member 100 from the filter assembly 10, the filter frame 300 can be separated from the cover frame 200. The both side portions of the filter frame 300 can be separated from the both side portions of the cover frame 200, and the upper and lower portions of the filter frame 300 may be separated from the upper and lower portions of the cover frame 200.

When the filter frame 300 is separated from the cover frame 200, the filter member 100 can be separated from the cover frame 200 to be washed with water. When cleaning the filter member 100, since the filter member 100 is made of a flexible material, the user can clean the filter member 100 by rubbing it with his or her hands. The cleaned filter member 100 can be assembled between the filter frame 300 and the cover frame 200 through the above-described assembly process of the filter assembly 10.

Although the present disclosure has been described in detail using preferred embodiments above, the scope of the present disclosure is not limited to the specific embodiments, and should be interpreted according to the appended claims. In addition, those skilled in the art should understand that modifications and variations may be made to the present disclosure without departing from the scope of the present disclosure.

What is claimed is:

1. An air purifier for filtering air, comprising:
a filter member for filtering pollutants in the air;
a blower for providing blowing force to allow the air to pass through the filter member;
a body frame accommodating the blower; and
a cover frame that forms a part of an appearance of the air purifier and is detachably coupled to the body frame; and
a filter frame that is detachably coupled to the cover frame and detachably supports at least a portion of the filter member,
wherein when the filter frame is coupled to the cover frame, the filter member is positioned between the cover frame and the filter frame so that movement of the filter member is restricted,
wherein when the cover frame is attached to and detached from the body frame, the filter member and the filter frame are attached and detached together with the cover frame,
wherein the cover frame includes:
a cover rib part including a plurality of cover rib members connected to each other;
a cover edge part connected to ends of the plurality of cover rib members and extending along an edge of the cover rib part;
a cover seating part extending along at least a portion of an edge of the filter member and protruding rearward from the cover edge part;
a cover engagement part formed in the cover seating part; and
a cover fixing part formed on the cover edge part,
wherein the filter frame includes:
a filter rib part including a plurality of filter rib members connected to each other;
a filter edge part connected to ends of the plurality of filter rib members and extending along an edge of the filter rib part;
a filter fixing part formed on the filter edge part so as to be engaged with the cover fixing part; and
a filter engagement part formed on the filter edge part to selectively engage with the cover engagement part, and
wherein the body frame includes an insertion groove portion in which a cover coupling part of the cover frame is inserted to be coupled.

2. The air purifier of claim 1,
wherein when viewed from a front side of the air purifier, the filter edge part has a wider width than that of the filter rib part.

3. The air purifier of claim 2,
wherein the plurality of filter rib members are disposed to face at least a portion of the plurality of cover rib members.

4. The air purifier of claim 3, wherein
the cover fixing part and the filter fixing part have a protrusion or groove shape to be engaged with each other.

5. The air purifier of claim 3, wherein the cover frame further includes:
a cover locking part protruding from the cover seating part toward a center of the cover frame, and
wherein the filter member is seated between the cover edge part and the cover locking part.

6. The air purifier of claim 5, wherein
the cover engagement part and the filter engagement part have a protrusion or groove shape to be engaged with each other.

7. The air purifier of claim 1, wherein the filter member is a filter net having a breaking strength in a range of 12 kgf to 16 kgf.

8. The air purifier of claim 1, wherein the filter member has flexibility so that a portion between opposite edges of the filter member is continuously bendable.

9. The air purifier of claim 1, further comprising:
an air filter for re-filtering the air filtered by the filter member.

10. The air purifier of claim 9, wherein the body frame further includes:
a body part providing a chamber in which the air filter and the blower are accommodated.

* * * * *